(12) United States Patent
Chen (10) Patent No.: US 11,598,875 B2
(45) Date of Patent: Mar. 7, 2023

(54) MULTIPATH LIGHT TEST DEVICE FOR TOF MODULE, DEPTH ERROR MEASURING METHOD AND SYSTEM

(71) Applicant: BEIJING XIAOMI MOBILE SOFTWARE CO., LTD., Beijing (CN)

(72) Inventor: Shu Chen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 375 days.

(21) Appl. No.: 16/826,292

(22) Filed: Mar. 22, 2020

(65) Prior Publication Data
US 2021/0149054 A1    May 20, 2021

(30) Foreign Application Priority Data
Nov. 20, 2019 (CN) .......................... 201911143700.5

(51) Int. Cl.
*G01S 17/894* (2020.01)
*G06T 7/521* (2017.01)
*G01S 17/36* (2006.01)

(52) U.S. Cl.
CPC ............ *G01S 17/894* (2020.01); *G01S 17/36* (2013.01); *G06T 7/521* (2017.01)

(58) Field of Classification Search
CPC ....... G01S 17/894; G01S 17/36; G06T 7/521; G01C 3/00; G01C 3/08
See application file for complete search history.

(56) References Cited

U.S. PATENT DOCUMENTS

| 4,068,952 A | * | 1/1978 | Erbert | G01S 7/497 356/4.02 |
| 4,121,890 A | * | 10/1978 | Braun | G01C 25/00 356/4.02 |
| 4,167,328 A | * | 9/1979 | Cross | G01S 7/497 356/4.02 |
| 4,189,233 A | * | 2/1980 | Hurt | G01S 7/497 356/4.02 |

(Continued)

FOREIGN PATENT DOCUMENTS

WO      2016171913 A1    10/2016

OTHER PUBLICATIONS

Extended European Search Report in U.S. Appl. No. 20/171,705, dated Sep. 16, 2020.

*Primary Examiner* — Luke D Ratcliffe
(74) *Attorney, Agent, or Firm* — Syncoda LLC; Feng Ma (57) ABSTRACT

A multipath light test device for a time of flight (TOF) module includes: a light-splitting plate configured to split light emitted from the TOF module; a first reflector plate connected to the light-splitting plate and forming a first angle with the light-splitting plate; and a second reflector plate disposed on one side opposite to the first reflector plate and forming a second angle with the first reflector plate; one part of the emitted light from the TOF module is returned to the TOF module along a first optical path after being reflected by the light-splitting plate with a first reflectivity; and the other part of the emitted light from the TOF module is transmitted through the light-splitting plate and incident to the first reflector plate and then returned to the TOF module along a second optical path.

20 Claims, 6 Drawing Sheets

(56) References Cited

U.S. PATENT DOCUMENTS

| | | | | |
|---|---|---|---|---|
| 4,552,454 A | * | 11/1985 | Glaser | G01S 7/497 |
| | | | | 356/4.02 |
| 4,627,723 A | * | 12/1986 | French | G01S 17/10 |
| | | | | 356/4.02 |
| 5,606,409 A | * | 2/1997 | Schneiter | G01B 11/026 |
| | | | | 356/3.07 |
| 2018/0278910 A1 | | 9/2018 | Schoenberg et al. | |
| 2019/0250258 A1 | * | 8/2019 | Crawford | G02F 1/0115 |
| 2020/0309927 A1 | * | 10/2020 | Tan | G01S 7/4816 |

\* cited by examiner

MULTIPATH LIGHT TEST DEVICE FOR TOF MODULE, DEPTH ERROR MEASURING METHOD AND SYSTEM

CROSS-REFERENCE TO RELATED APPLICATION

This application claims priority to Chinese Patent Application No. 201911143700.5 filed on Nov. 20, 2019, the disclosure of which is hereby incorporated by reference in its entirety.

BACKGROUND 3D imaging technologies are getting more and more attention. Compared with 2D imaging, 3D imaging needs to further obtain depth values of an object. The depth value of the object can be obtained through a time of flight (TOF) module. Working principle of the TOF module can be as follows: light pulse is continuously sent to a target, and then the TOF module is utilized to receive light returned from the target such that the distance between the target and the TOF module is obtained by detecting the time of flight of the light pulses, and then the depth value of the target is obtained.

SUMMARY

The present disclosure relates generally to light detection and measurement, and more specifically to a multipath light test device for a TOF module, and depth error measuring method and system.

Various embodiments of the present disclosure provide a multipath light test device for a TOF module, and a method for measuring depth error and a system for measuring depth error so as to resolve problems in existing technologies.

According to a first aspect of the embodiments of the present disclosure, there is provided a multipath light test device for a TOF module, including: a light-splitting plate configured to split light emitted from the TOF module; a first reflector plate connected to the light-splitting plate and forming a first angle with the light-splitting plate; and a second reflector plate disposed on one side opposite to the first reflector plate, forming a second angle with the first reflector plate; one part of light in the emitted light from the TOF module is returned to the TOF module along a first optical path after being reflected by the light-splitting plate with a first reflectivity; and the other part of the emitted light from the TOF module is transmitted through the light-splitting plate and incident to the first reflector plate and then returned to the TOF module along a second optical path.

In one embodiment, the first optical path includes: an incident light path along which the light is incident to the light-splitting plate and a first return light path along which the light is returned to the TOF module; and the second optical path includes: a first incident light path along which the incident light is incident to the light-splitting plate, a second incident light path along which the light is transmitted through the light-splitting plate and incident to the first reflector plate, and a second return light path along which the light is reflected by the first reflector plate and the second reflector plate and returned to the TOF module.

In another embodiment, each of the first angle and the second angle is 45°.

In still another embodiment, the second return light path includes: a third incident light path along which the light transmitted through the light-splitting plate and incident to the first reflector plate is reflected by the first reflector plate and incident to the second reflector plate, a third reflected light path along which the light is reflected by the second reflector plate to the first reflector plate, a fourth incident light path along which the light is reflected by the first reflector plate and incident to the light-splitting plate, and a light path along which the light is transmitted through the light-splitting plate and returned to the TOF module.

In still another embodiment, one part of light that is reflected by the first reflector plate and incident to the light-splitting plate is reflected by the light-splitting plate; reflected light is incident to the first reflector plate and returned to the TOF module along a third optical path; and the third optical path includes: a first incident light path along which the incident light is incident to the light-splitting plate, a second incident light path along which the light is transmitted through the light-splitting plate and incident to the first reflector plate, a third incident light path along which the light is reflected by the first reflector plate and incident to the second reflector plate, a third reflected light path along which the light is reflected by the second reflector plate to the first reflector plate, a fourth incident light path along which the light is reflected by the first reflector plate and incident to the light-splitting plate, a fifth incident light path along which the light is reflected by the light-splitting plate and incident to the first reflector plate, a sixth incident light path along which the light is reflected by the first reflector plate and incident to the second reflector plate, a sixth reflected light path along which the light is reflected by the second reflector plate to the first reflector plate, a seventh incident light path along which the light is reflected by the first reflector plate and incident to the light-splitting plate, and a light path along which the light is transmitted through the light-splitting plate and returned to the TOP module.

In still another embodiment, light-splitting layers are coated on both sides of the light-splitting plate for splitting the light incident to the light-splitting plate to a light reflected from the light-splitting plate and a light transmitted through the light-splitting plate.

In still another embodiment, the multipath light test device for the TOF module also comprises a housing; the housing is provided with a window; the light-splitting plate is disposed at the window; and the first reflector plate and the second reflector plate are disposed within the housing.

In still another embodiment, the multipath light test device for the TOF module also comprises: a base on which the housing is disposed; a slide rail disposed on the base; and a support disposed on the slide rail and movable along the lengthwise direction of the slide rail, the TOF module being disposed on the support; wherein a distance between the TOF module and the light-splitting plate is adjusted by movement of the support on the slide rail.

In still another embodiment, the TOF module mounted on the support is arranged opposite to a central area of the light-splitting plate.

According to a second aspect of the embodiments of the present disclosure, there is provided an error measuring system for the depth value of a TOF module, including: the multipath light test device for the TOF module in accordance with the first aspect and any embodiment of the first aspect; the TOF module configured to emit light towards the multipath light test device for the TOF module and acquire the measured depth value of the light-splitting plate; an acquiring module configured to acquire a distance from a light source of the TOF module mounted on the support to the light-splitting plate based on position of the support on the slide rail, and take the distance as a theoretical depth value;

and a processing module configured to receive the theoretical depth value acquired by the acquiring module, receive the measured depth value acquired by the TOF module, compare the theoretical depth value with the measured depth value, and calculate the error of the depth value of the TOF module resulted from the multipath light.

In one embodiment, the measured depth value is a depth value from the light source of the TOF module to a central area of the light-splitting plate.

In another embodiment, the measured depth value is acquired by the TOF module through measuring the depth value of the light-splitting plate based on light from the first optical path and light from the second optical path.

In still another embodiment, the measured depth value is acquired by the TOF module through measuring the depth value of the light-splitting plate based on light from the first optical path, light from the second optical path, and light from the third optical path.

According to a third aspect of the embodiments of the present disclosure, there is provided an error measuring method for the depth value of a TOF module, employing the error measuring system for the depth value of the TOF module in accordance with the second aspect and any embodiment of the second aspect, comprising: allowing the TOF module to emit light towards the multipath light test device for the TOF module and acquire the measured depth value of the light-splitting plate; acquiring the theoretical depth value from the light source of the TOF module to the light-splitting plate; and comparing the theoretical depth value with the measured depth value, and calculating the error of the depth value of the TOF module resulted from the multipath light.

In one embodiment, the theoretical depth value is the distance between the light source of the TOF module and the light-splitting plate; and the measured depth value refers to a depth value of the light-splitting plate calculated according to the time during which light, emitted from the TOF module towards the multipath light test device for the TOF module, is returned through the multipath light test device for the TOF module.

In another embodiment, the measured depth value refers to a depth value from the light source of the TOF module to the central area of the light-splitting plate.

In still another embodiment, the measured depth value is acquired by the TOF module through measuring the depth value of the light-splitting plate based on light from the first optical path and light from the second optical path.

In still another embodiment, the measured depth value is acquired by the TOF module through measuring the depth value of the light-splitting plate based on light from the first optical path, light from the second optical path and light from the third optical path.

According to a fourth aspect of the embodiments of the present disclosure, there is provided an electronic device including: a memory configured to store instructions; and a processor configured to call the instructions to execute the error measuring method for the depth value of the TOF module in accordance with the third aspect or any embodiment of the third aspect.

According to a fifth aspect of the embodiments of the present disclosure, there is provided a non-transitory computer-readable memory medium having stored therein computer-executable instructions and being configured to implement the error measuring method for the depth value of the TOF module in accordance with the third aspect or any embodiment of the third aspect when the computer-executable instructions are executed by a processor.

It should be understood that the above general description and the following detailed description are exemplary and explanatory, and are not intended to limit the present disclosure.

BRIEF DESCRIPTION OF THE DRAWINGS

The accompanying drawings, which are incorporated in and constitute a part of this disclosure, illustrate embodiments consistent with the disclosure and, together with the disclosure, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Principles and spirit of the present disclosure will be described below with reference to several exemplary embodiments. It should be understood that these embodiments are given only to enable those skilled in the art to better understand and implement the present disclosure, and not to limit the scope of the present disclosure in any way.

It should be noted that although the expressions "first," "second" and the like are used herein to describe different modules, steps, data and the like of the embodiments of the present disclosure, the expressions "first" and "second" are only for the purpose of distinguishing different modules, steps, data and the like, and do not indicate a specific order or importance. In fact, the expressions "first" and "second" are completely interchangeable.

In order to better understand a device in accordance with the present disclosure, a preferred embodiment of the device in the present disclosure will be further described hereinafter with reference to the accompanying drawings. The orientation or positional relationships indicated by the terms "center," "longitudinal," "transverse," "front," "back," "left," "right," "vertical," "horizontal," "top," "bottom," "inner," "outer" and the like are based on the orientation or positional relationships shown in the drawings, only for the convenience of describing the embodiments and simplifying the description, rather than indicating or suggesting that the referred device or element must have a specific orientation and be constructed and operated with a specific orientation, so it cannot be construed as a limitation on the scope of protection of this embodiment. The same reference number indicates the structure of the same type.

In the process of applying the TOF module, it is often affected by multipath light, resulting in deviation in the measured depth of the target. Because the multipath light is often uncontrollable, the impact of the multipath light on the depth value of the target measured based on the TOF module cannot be specifically determined.

Figure 1:
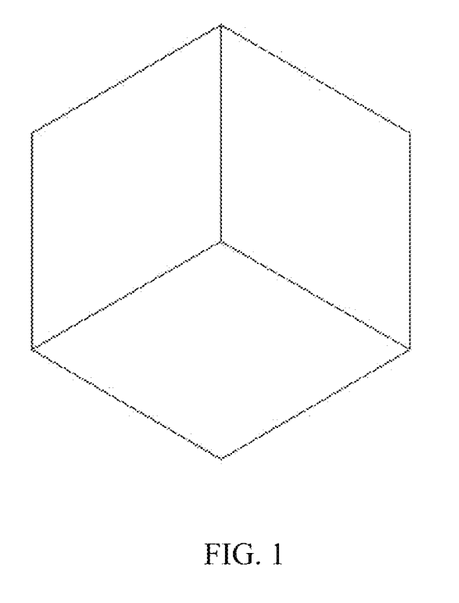
FIG. 1 is a schematic diagram illustrating the impact of multipath light on the depth value measured by the TOF module.
Figure 2:
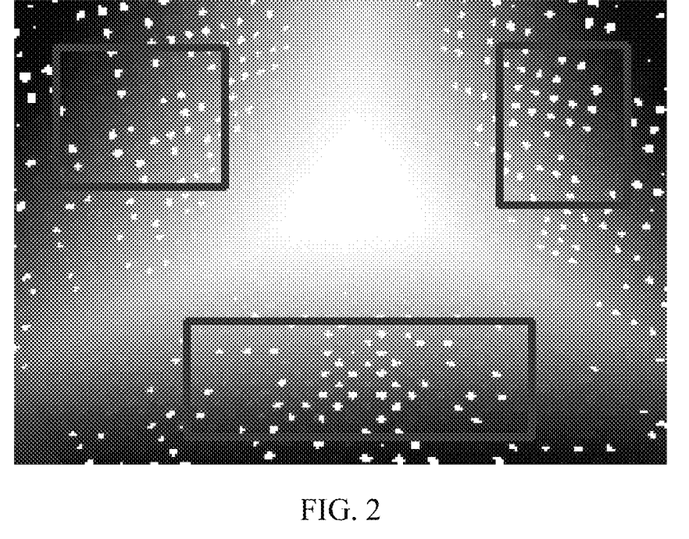
FIG. 2 is a schematic diagram illustrating the impact of multipath light on the depth value measured by the TOF module.

FIG. 1 is a schematic diagram illustrating the impact of multipath light on the depth value measured by the TOF module. FIG. 2 is a schematic diagram illustrating the impact of multipath light on the depth value measured by the TOF module.

As shown in FIGS. 1 and 2, the impact of the multipath light on the depth value output by the TOF module is measured by the following approaches. That is to say, the TOF module is aligned at a three-sided tapered corner with high reflectivity as shown in FIG. 1 to form the multipath light. A depth graph formed by the three-sided tapered corner is acquired, and the impact degree of the multipath light on the depth value acquired and outputted by the TOF module is determined by judging whether the depth graph can restore the three-sided tapered corner.

As multipath light path formed by emitting light to the three-sided tapered corner with high reflectivity is uncontrollable, specific impact of the multipath light on the depth value acquired and outputted by the TOF module cannot be accurately determined based on the current method.

The impact of the multipath light on the TOF module is typically determined by observing the acquired depth graph. However, this method has strong subjectivity and cannot objectively and qualitatively describe the impact of the multipath light on the TOF module.

Various embodiments of the present disclosure provide a multipath light test device for a TOF module.

Figure 3:
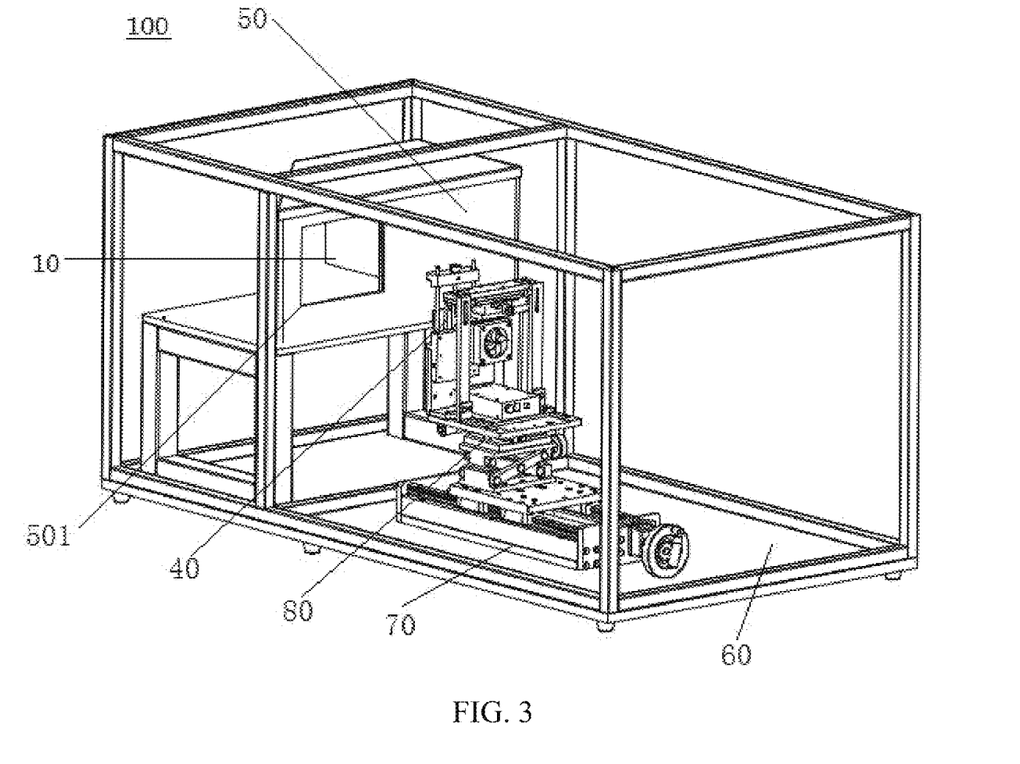
FIG. 3 is a schematic diagram illustrating a multipath light test device for a TOF module in accordance with some embodiments of the present disclosure.
Figure 4:
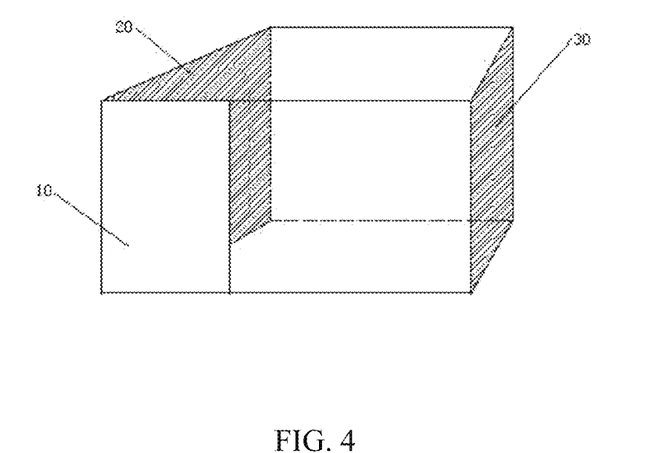
FIG. 4 is a schematic diagram illustrating the positional relationships among a light-splitting plate, a first reflector plate and a second reflector plate in the multipath light test device for the TOF module in accordance with some embodiments of the present disclosure.

FIG. 3 is a schematic diagram of a multipath light test device for a TOF module in accordance with some embodiments of the present disclosure. FIG. 4 is a schematic diagram illustrating the positional relationships among a light-splitting plate, a first reflector plate and a second reflector plate in the multipath light test device for the TOF module in accordance with some embodiments of the present disclosure.

As shown in FIGS. 3 and 4, a multipath light test device 100 for a TOF module comprises a light-splitting plate 10, a first reflector plate 20 connected with the light-splitting plate 10, and a second reflector plate 30 arranged opposite to the first reflector plate 20.

The light-splitting plate 10 is configured to split light emitted from a TOF module 40. The "light-splitting" of the light-splitting plate 10 refers to that one part of light incident to the light-splitting plate 10 can be reflected, and the other part of light can be transmitted through the light-splitting plate 10. For instance, the light emitted from the TOF module 40 is incident to the light-splitting plate 10, the light-splitting plate 10 directly reflects one part of light to the TOF module 40 and allows the other part of light to transmit through the light-splitting plate 10 and then be incident to the first reflector plate 20.

In one exemplary embodiment of the present disclosure, the light-splitting plate 10 reflects the light emitted from the TOF module 40 with a first reflectivity. For instance, the first reflectivity may be 50%. When the first reflectivity is 50%, after the light emitted from the TOF module 40 is incident to the light-splitting plate 10, 50% of the emitted light is reflected by the light-splitting plate 10 and then returned to the TOF module, and the remaining 50% light is transmitted through the light-splitting plate 10 and then incident to the first reflector plate 20.

The first reflector plate 20 is connected to the light-splitting plate 10, and the first reflector plate 20 and the light-splitting plate 10 are arranged to form a first angle. The first angle may be 45° or 30°. The light which is transmitted through the light-splitting plate 10 and then incident to the first reflector plate 20 is reflected by the first reflector plate 20 and then incident to the second reflector plate 30.

The second reflector plate 30 is arranged opposite to the first reflector plate 20, and the second reflector plate 30 and the first reflector plate 20 are arranged to form a second angle. That is, an extension line of the second reflector plate 30 is intersected with an extension line of the first reflector plate 20 to form the second angle. The second angle may be 45° or 30°.

Each of the first reflector plate 20 and the second reflector plate 30 has high reflectivity or total reflection capacity. That is, after light is incident to the first reflector plate 20 or the second reflector plate 30, the incident light may be not absorbed by the reflector plates but totally reflected.

After the light emitted from the TOF module 40 is incident to the light-splitting plate 10, one part of the emitted light is reflected by the light-splitting plate 10 with the first reflectivity, and the reflected light may be returned to the TOF module 40 along a first optical path.

In the multipath light test device 100 for the TOF module in accordance with the present disclosure, the light-splitting plate 10 is adopted to split the light emitted from the TOF module 40. By utilization of the reasonable arrangement of the light-splitting plate 10, the first reflector plate 20 and the second reflector plate 30, one part of light emitted from the TOF module 40 is reflected by the light-splitting plate 10 with the first reflectivity and then returned to the TOF module 40 along a first optical path 200, and the other part of light emitted from the TOF module 40 is transmitted through the light-splitting plate 10 and incident to the first reflector plate 20 and the second reflector plate 30 and then returned to the TOF module 40 along a second optical path 300. The error of the depth value acquired by the TOF module 40 due to the multipath light can be qualitatively and quantitatively determined by employing the multipath light test device in the present disclosure.

Figure 5:
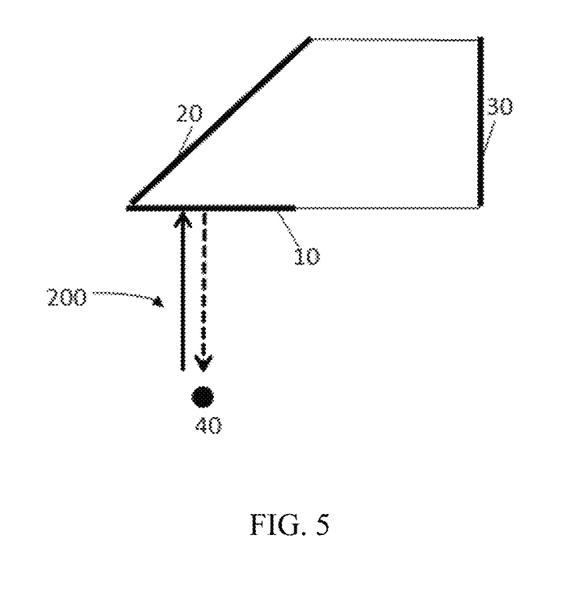
FIG. 5 is a schematic diagram illustrating a first optical path in the multipath light test device for the TOF module in accordance with some embodiments of the present disclosure.

FIG. 5 is a schematic diagram illustrating the first optical path in the multipath light test device for the TOF module in accordance with some embodiments of the present disclosure.

In one exemplary embodiment of the present disclosure, as shown in FIG. 5, the first optical path 200 includes: an incident light path along which the emitted light from the TOF module 40 is incident to the light-splitting plate 10, and a first return light path along which the emitted light is reflected by the light-splitting plate 10 and returned to the TOF module 40.

As shown in FIG. 5, after the light-splitting process of the light-splitting plate 10, one part of the emitted light from the TOF module 40 is directly returned to the TOF module 40 along the first optical path 200. Herein, this part of the emitted light may be referred to as first path light. The "flight" distance of the first path light may be construed as a length of a first path in the multipath light. Accordingly, the first path light refers to light "flying" along the first path. It should be noted that a length of the incident light path for the light emitted from the TOF module 40 and then be incident to the light-splitting plate 10 is equal to a length of the first return light path for the emitted light reflected by the light splittter 10 and returned to the TOF module 40, and a direction of the incident light path is opposite to a direction of the first return light path.

Figure 6:
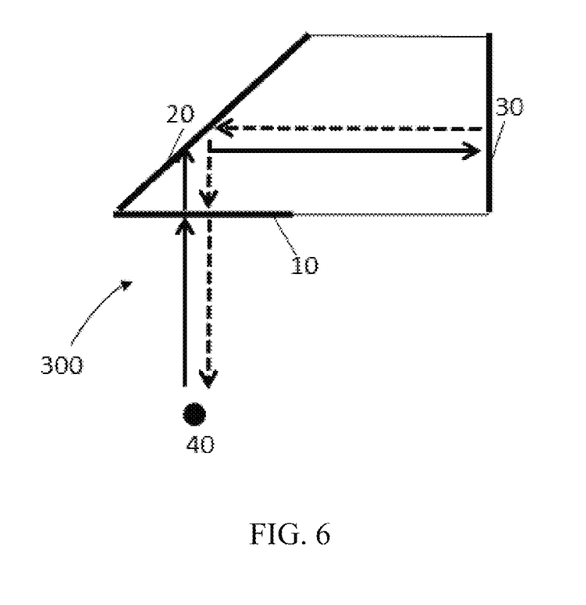
FIG. 6 is a schematic diagram illustrating a second optical path in the multipath light test device for the TOF module in accordance with some embodiments of the present disclosure.

FIG. 6 is a schematic diagram illustrating the second optical path in the multipath light test device for the TOF module in accordance with some embodiments of the present disclosure.

The other part of the emitted light from the TOF module 40 is transmitted through the light-splitting plate 10 and incident to the first reflector plate 20 and the second reflector plate 30 and then returned to the TOF module 40 along the second optical path 300.

The second optical path 300 includes: a first incident light path along which the emitted light from the TOF module 40 is incident to the light-splitting plate 10, a second incident light path along which the light is transmitted through the light-splitting plate 10 and incident to the first reflector plate 20, and a second return light path along which the light is reflected by the first reflector plate 20 and the second reflector plate 30 in succession and then returned to the TOF module 40.

It should be noted that the first incident light path along which the emitted light from the TOF module 40 is incident to the light-splitting plate 10 and the incident light path along which the emitted light from the TOF module 40 is incident to the light-splitting plate 10 are a same light path.

Figure 7:
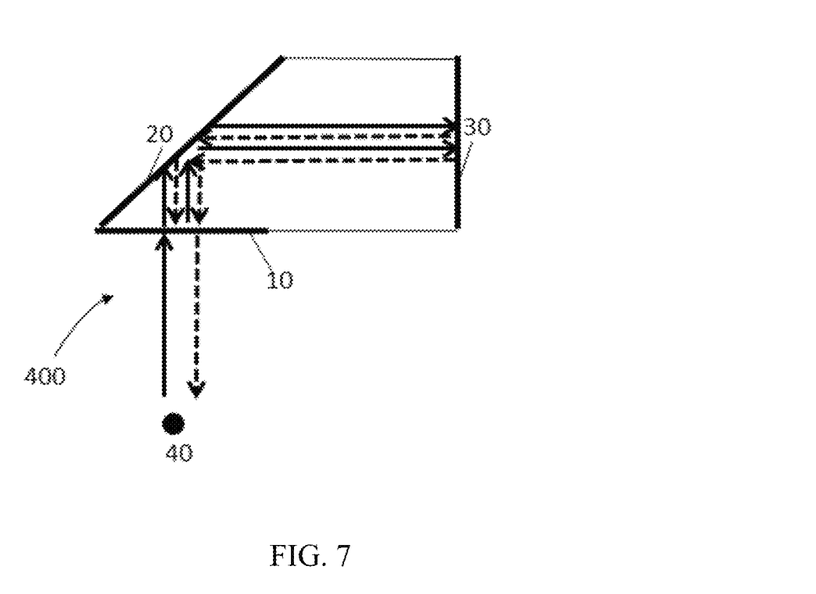
FIG. 7 is a schematic diagram illustrating a third optical path in the multipath light test device for the TOF module in accordance with some embodiments of the present disclosure.

As shown in FIG. 6, after the light-splitting process of the light-splitting plate 10, the other part of the emitted light from the TOF module 40 is transmitted through the light-splitting plate 10 and incident to the first reflector plate 20. Herein, this part of emitted light may be referred to as a second path light. The second path light incident to the first reflector plate 20 is sequentially reflected by the second reflector plate 30 and the first reflector plate 20, and is then incident to the light-splitting plate 10. After the light-splitting process of the light-splitting plate 10 again, one part of the second path light is reflected to the first reflector plate 20, and this part of light may be referred to as a primary reflected light (as shown in FIG. 7 not in FIG. 6). The other part of the second path light, which may be referred to as a primary outgoing light, is transmitted through the light-splitting plate 10 and then returned to the TOF module 40.

In view of the entire "flight" process of the primary outgoing light in the second path light, the primary outgoing light is returned to the TOF module 40 along the second optical path 300. The "flight" distance of the primary outgoing light may be construed as a length of a second path in the multipath light. Accordingly, the primary outgoing light refers to light "flying" along the second path.

The light-splitting plate 10 and the first reflector plate 20 are connected at a first angle. The "first angle" may be adjusted according to the specific conditions of the multipath light required to be tested in actual application. In the case that the depth value of the same target area is measured based on the same TOF module 40, the controllable multipath light formed by the multipath light test device 100 for the TOF module in the present disclosure may vary with different first angle. Different errors of the depth value of the target area measured by the TOF module 40 due to different multipath light can be qualitatively or quantitatively determined.

The second angle may be correspondingly adjusted with the first angle based on the reflection principle, so as to ensure that the second path light can return to the TOF module 40 along the second optical path 300.

In one exemplary embodiment of the present disclosure, the first angle may be 45°. According to the reflection principle, the second angle may be calculated as 45° if the other part of the emitted light from the TOF module 40 is transmitted through the light-splitting plate 10 and incident to the first reflector plate 20 and the second reflector plate 30 successively and returned to the TOF module 40 along the second optical path 300.

In one exemplary embodiment of the present disclosure, the second return light path includes: a third incident light path along which the light transmitted through the light-splitting plate 10 and incident to the first reflector plate 20 is reflected by the first reflector plate 20 and incident to the second reflector plate 30; a third reflected light path along which the light is reflected by the second reflector plate 30 and incident to the first reflector plate 20; a fourth incident light path along which the light is reflected by the first reflector plate 20 and incident to the light-splitting plate 10; and a light path along which the light is transmitted through the light-splitting plate 10 and returned to the TOF module.

In actual application, if a light intensity of the primary outgoing light is lower than an intensity threshold, the "flight" distance of the primary outgoing light is not taken into consideration, namely without considering the error of the depth value acquired and outputted by the TOF module 40 due to the light "flying" along the second path (or the second optical path 300); and if the light intensity of the primary outgoing light is higher than the intensity threshold, the error of the depth value acquired and outputted by the TOF module 40 due to the light "flying" along the second path (or the second optical path 300) shall be taken into consideration.

FIG. 7 is a schematic diagram illustrating the third optical path in the multipath light test device for the TOF module in accordance with some embodiments of the present disclosure.

In one exemplary embodiment of the present disclosure, as shown in FIG. 7, the primary reflected light described above, namely the part light reflected by the light-splitting plate 10 among the light reflected by the first reflector plate 20 and incident to the light-splitting plate 10 (the second path light), may be incident to the first reflector plate 20, sequentially reflected by the second reflector plate 30 and the first reflector plate 20, and then incident to the light-splitting plate 10.

As the light-splitting plate 10 has light-splitting ability, one part of the primary reflected light, which may be referred to as secondary reflected light, is reflected to the first reflector plate 20 again. The other part of the primary reflected light, which may be referred to as secondary outgoing light, will be transmitted through the light-splitting plate 10 and returned to the TOF module 40.

In view of the entire "flight" process of the secondary outgoing light, the secondary outgoing light is returned to the TOF module 40 along a third optical path 400. The "flight" distance of the secondary outgoing light may be construed as a length of a third path in the multipath light. Correspondingly, the secondary outgoing light forms light "flying" along the third path.

The third optical path 400 includes: a first incident light path along which the emitted light from the TOF module 40 is incident to the light-splitting plate 10; a second incident light path along which the light is transmitted through the light-splitting plate 10 and incident to the first reflector plate 20; a third incident light path along which the light is reflected by the first reflector plate 20 and incident to the second reflector plate 30; a third reflected light path along which the light is reflected by the second reflector plate 30 to the first reflector plate 20; a fourth incident light path along which the light is reflected by the first reflector plate 20 and incident to the bream splitter 10; a fifth incident light path along which the light is reflected by the light-splitting plate 10 and incident to the first reflector plate 20; a sixth incident light path along which the light is reflected by the first reflector plate 20 and incident to the second reflector plate 30; a sixth reflected light path along which the light is reflected by the second reflector plate 30 to the first reflector plate 20; a seventh incident light path along which the light is reflected by the first reflector plate 20 and incident to the light-splitting plate 10; and a light path along which the light is transmitted through the light-splitting plate 10 and returned to the TOF module 40.

It should be noted that if the light intensity of the primary outgoing light is lower than the intensity threshold, the light intensity of the secondary outgoing light formed based on the primary reflected light is certainly lower than the intensity threshold. In this case, the error of the depth value acquired and outputted by the TOF module 40 due to the light formed by the secondary outgoing light and "flying" along the third path (or the third optical path) in the multipath light will not be considered. Or else, whether the light intensity of the secondary outgoing light is higher than the intensity threshold must be further determined; and, if higher than the intensity threshold, the impact of the "flight" distance of the secondary outgoing light on error of the depth value acquired and outputted by the TOF module 40 must be considered.

It should be noted that the intensity threshold may be adjusted according to actual conditions. For instance, the intensity threshold may be 10% of that of the emitted light from the TOF module 40.

Similarly, the secondary reflected light described above may be incident to the first reflector plate 20 again and is sequentially reflected by the second reflector plate 30 and the first reflector plate 20 and incident to the light-splitting plate 10 again.

As the light-splitting plate 10 has light-splitting ability, one part of the secondary reflected light, which may be referred to as tertiary reflected light, is reflected to the first reflector plate 20 again. The other part of the secondary reflected light, which may be referred to as tertiary emitted light, is transmitted through the light-splitting plate 10 and returned to the TOF module 40.

In view of the entire "flight" process of the tertiary emitted light, the tertiary emitted light is returned to the TOF module 40 along a fourth optical path. The "flight" distance of the tertiary emitted light may be construed as a length of a fourth path in the multipath light. Correspondingly, the tertiary emitted light forms light "flying" along the fourth path.

It should be noted that if the light intensity of the secondary outgoing light is lower than the intensity threshold, the light intensity of the tertiary emitted light formed based on the secondary reflected light is certainly lower than the intensity threshold. In this case, the error of the depth value acquired and outputted by the TOF module 40 due to the light being formed by the tertiary emitted light and "flying" along the fourth path (or the fourth optical path) in the multipath light will not be considered. Or else, whether the light intensity of the tertiary emitted light is higher than the intensity threshold must be further determined; and if higher than the intensity threshold, the impact of the "flight" distance of the tertiary emitted light on the error of the depth value acquired and outputted by the TOF module 40 must be considered.

As the forming principle of the light "flying" along the fourth path and the light "flying" along the fifth path is the same as that of the light "flying" along the second path or the light "flying" along the third path, no further description will be given herein.

The light-splitting plate 10 may perform light-splitting process on the emitted light from the TOF module 40. The light-splitting process degree, namely the reflecting ability of the light-splitting plate 10, may be adjusted by correspondingly treatment on the light-splitting plate 10 according to actual demands.

In one exemplary embodiment of the present disclosure, light-splitting layers may be coated on both sides of the light-splitting plate 10. The light-splitting layer may divide/split the light incident to the light-splitting plate 10 into light reflected from the light-splitting plate 10 and light transmitted through the light-splitting plate 10.

The light-splitting processing ability of the light-splitting plate 10, namely the reflecting capacity or the reflectivity of the light-splitting plate 10, may be adjusted by adjusting the light-splitting layer.

In one exemplary embodiment of the present disclosure, the reflectivity of the light-splitting plate 10 may be 50%. After the emitted light from the TOF module 40 is processed by the light-splitting plate 10, 50% of the emitted light, i.e. the above first path light, is reflected by the light-splitting plate 10 and returned to the TOF module 40 along the first optical path 200.

The other 50% of the emitted light, i.e. the second path light described above, is transmitted through the light-splitting plate 10 and incident to the first reflector plate 20. The first path light and the second path light with different light intensities will be generated with different reflectivity of the light-splitting plate 10.

In one exemplary embodiment of the present disclosure, the multipath light test device 100 for the TOF module also comprises a housing 50.

Herein, the housing 50 is provided with a window 501; the light-splitting plate 10 is disposed at the window 501; and the first reflector plate 20 and the second reflector plate 30 are disposed within the housing 50.

In actual application, the dimension of the light-splitting plate 10 may further be consistent with that of the window 501.

As the light-splitting plate 10 is disposed at the window 501 of the housing 50 and the first reflector plate 20 and the second reflector plate 30 are disposed within the housing 50, that part of light transmitted through the light-splitting plate 10 (the second path light) among the emitted light emitted from the TOF module 40 may be reflected by the first reflector plate 20 and the second reflector plate 30 once or multiple times in an enclosed environment, so as to avoid the impact of other stray light in the process of forming the light "flying" along multiple paths, and then the controllable multipath light formed by the multipath light test device 100 for the TOF module can be more accurate.

In one exemplary embodiment of the present disclosure, the multipath light test device 100 for the TOF module further comprises a base 60, a slide rail 70 disposed on the base 60, and a support 80 disposed on the slide rail 70.

Herein, the housing 50 is disposed on the base 60; the slide rail 70 is disposed on the base 60; the support 80 is disposed on the slide rail 70 and movable along the lengthwise direction of the slide rail 70. The TOF module 40 is disposed on the support 80, and the distance between the TOF module 40 and the light-splitting plate 10 is adjusted by the support 80 moving on the slide rail 70.

In actual application, based on different distances between the TOF module 40 and the light-splitting plate 10, the multipath light test device 100 for the TOF module may be utilized to test the multipath light corresponding to the distance between the TOF module 40 and the light-splitting plate 10.

In one exemplary embodiment of the present disclosure, the TOF module 40 mounted on the support 80 is arranged opposite to the central area of the light-splitting plate 10.

Figure 8:
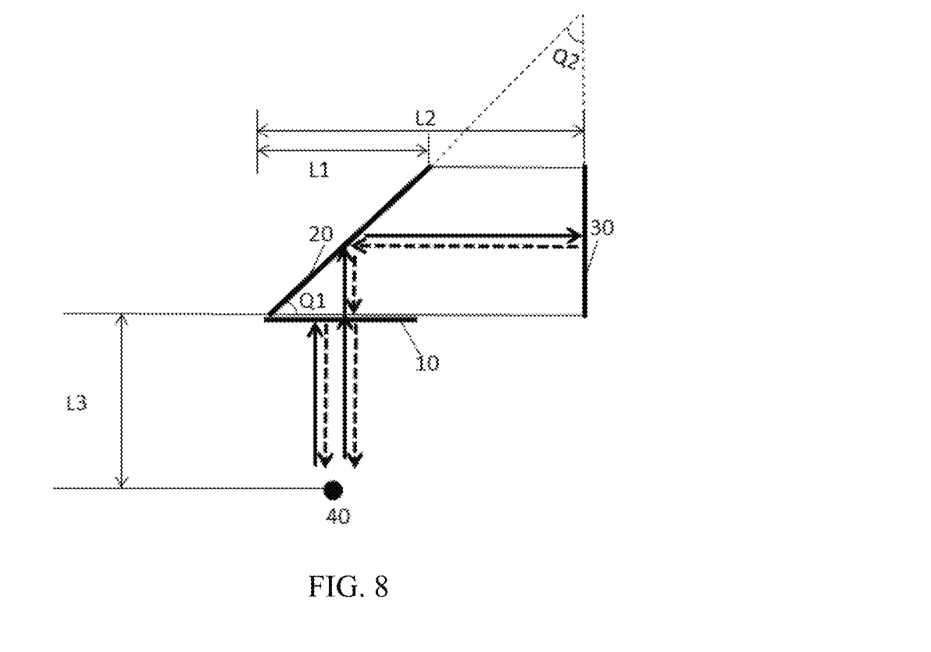
FIG. 8 is a schematic diagram illustrating a light path produced in the use process by the multipath light test device for the TOF module in accordance with some embodiments of the present disclosure.

FIG. 8 is a schematic diagram illustrating a light path generated in use by a multipath light test device for the TOF module in accordance with some embodiments of the present disclosure.

Referring to FIG. 8, the following example is used for illustration in order to more clearly show the working principle of the present disclosure.

In actual application, the TOF module 40 may be arranged facing the multipath light test device for the TOF module in the present disclosure. For the convenience of calculating the specific distance of the multipath light formed by the multipath light test device 100 for the TOF module, the central area of the light-splitting plate 10 may be selected as a target area of which the TOF module 40 acquires and outputs the depth value.

The central area may be determined according to actual conditions, for example, may be a circular area determined by taking a center point of the light-splitting plate 10 as a center of the circle area and taking 30% of the shortest side length of the light-splitting plate 10 as a radius of the circle area.

In application, the TOF module 40 is disposed on the support 80; the support 80 is disposed on the slide rail 70; and the distance L3 between the TOF module 40 and the light-splitting plate 10 of the device is adjusted through the slide rail 70.

Assuming distance L3 between the TOF module 40 and the light-splitting plate 10 is 40 cm and there is no multipath light path (i.e. the light-splitting plate 10 without light-splitting ability is a total reflection plate, since the distance between the TOF module 40 and the target area is 40 cm, the "flight" distance of the emitted light from the TOF module 40 relative to the target area, measured based on the TOF algorithm, may be 40 cm*2. Thus, the depth value of the target area acquired and outputted by the TOF module 40 may be determined based on the "flight" distance of the emitted light from the TOF module 40 relative to the target area. In actual application, the depth value of the target area determined based on the "flight" distance of the emitted light from the TOF module relative to the target area may be taken as the theoretical depth value of the target area.

In order to test the multipath light, the light-splitting plate 10 has light-splitting ability which is determined according to the reflectivity of the light-splitting plate 10. It is assumed that the reflectivity of the light-splitting plate 10 is 50%, the length L2 of one side of the housing 50 provided with the window 501 is 36 cm, the length L1 of the window 501 is 16 cm, and correspondingly, the length of the light-splitting plate 10 is also 16 cm.

For the convenience of calculation, the first angle Q1 is 45°, and according to the reflection principle, the second angle Q2 may be determined to be 45° as well.

When the TOF module 40 emits the light towards the light-splitting plate 10 of the multipath light test device 100 for the TOF module, as the reflectivity of the light-splitting plate 10 is 50%, 50% of the emitted light (i.e. the first path light) is reflected by the light-splitting plate 10 and returned to the TOF module 40 along the first optical path 200 (i.e. an incident light path along which the emitted light from the TOF module 40 is incident to the light-splitting plate 10 and the first return light path along which the emitted light is returned to the TOF module 40), with the distance of 40 cm*2. In this case, the "flight" distance of the first path light, namely the length of the first path in the above-mentioned multipath light, is 40 cm*2.

The other 50% emitted light (i.e. the second path light) will be transmitted through the light-splitting plate 10 into the housing 50 and incident on the first reflector plate 20. As the first reflector plate 20 has total reflection property, according to the reflection principle, the second path light will be totally reflected to the second reflector plate 30. Similarly, as the second reflector plate 30 has total reflection property, the second path light will be totally reflected to the first reflector plate 20. Then, the second path light totally reflected to the first reflector plate 20 is incident to the light-splitting plate 10.

Based on the 50% reflectivity of the light-splitting plate, 50% of the second path light (i.e. the above-mentioned primary reflected light) will be reflected to the first reflector plate 20 again. The remaining 50% of the second path light (i.e. the primary outgoing light described above) will be directly transmitted through the light-splitting plate 10 and returned to the TOF module 40. In this case, the intensity of the primary outgoing light is 25% (i.e. 50%*50%) of the light intensity of the emitted light from the TOF module 40.

It is assumed that an intensity threshold is 10% of the emitted light from the TOF module. As the intensity of the primary outgoing light is higher than the intensity threshold, the impact of the "flight" distance of the primary outgoing light on error of the depth value acquired and outputted by the TOF module 40 must be considered. In this case, the "flight" distance of the primary outgoing light, namely the length of the second path in the above-mentioned multipath light, is 40 cm*2+(8+8+20)cm*2.

As for the above "second path light," one part is returned to the TOF module 40 in the form of primary outgoing light, and the other part will be reflected to the first reflector plate 20 again in the form of the primary reflected light. Herein, the light intensity of the primary reflected light is 25% (i.e. 50%*50%) of the light intensity of the emitted light from the TOF module 40.

The primary reflected light is subjected to the total reflection of the second reflector plate 20 and the first reflector plate 30 in sequence, and is then incident to the light-splitting plate 10 again. Based on the 50% reflectivity of the light-splitting plate, 50% of the primary reflected light (i.e. the above-mentioned secondary reflected light) will be reflected to the first reflector plate 20 again, and the remaining 50% of the primary reflected light (i.e. the above-mentioned secondary outgoing light) will be directly transmitted through the light-splitting plate 10 and returned to the TOF module 40. In this case, the light intensity of the secondary outgoing light is 12.5% (i.e. 50%*50%*50%) of the light intensity of the emitted light from the TOF module 40.

Assuming the intensity threshold is 10% of the emitted light from the TOF module 40, as the intensity of the secondary outgoing light is higher than the intensity threshold, the impact of the "flight" distance of the secondary outgoing light on the error of the depth value acquired and outputted by the TOF module 40 must be considered. In this case, the "flight" distance of the secondary outgoing light (i.e. the length of the third path in the multipath light mentioned above) is 40 cm*2+(8+8+20)cm*2+(8+8+20)cm*2.

Similarly, the light intensity of the tertiary emitted light formed based on the secondary reflected light is 6.25% (i.e. 50%*50%*50%*50%) of the light intensity of the emitted light from the TOF module 40. As the intensity threshold is 10% of the emitted light from the TOF module 40 and the light intensity of the tertiary emitted light is lower than the intensity threshold, the impact of the "flight" distance of the tertiary emitted light on the error of the depth value acquired and outputted by the TOF module 40 is not to be considered.

As can be seen, as for this example, the multipath light having impact on the error of the depth value acquired and outputted by the TOF module 40 includes lights mixed by long and short paths which are light "flying" along the first path (the distance/length is 80 cm), light "flying" along the second path (the distance/length is 152 cm), and light "flying" along the third path (the distance/length is 224 cm).

In actual application, the multipath light that causes error to the depth value acquired and outputted by the TOF module 40 may also be controllably adjusted by adjusting the reflectivity of the light-splitting plate 10, the first angle and the second angle.

Based on the same invention concept, the embodiment of the present disclosure further provides an error measuring system for the depth value of a TOF module, which comprises: the multipath light test device 100 for the TOF module in accordance with the first aspect or any embodiment of the first aspect, a TOF module 40, an acquiring module and a processing module.

The TOF module 40 is configured to emit light towards the multipath light test device 100 for the TOF module, so as to acquire the measured depth value of the light-splitting plate 10.

The acquiring module is configured to acquire the distance between a light source of the TOF module 40 mounted on the support 80 and the light-splitting plate 10 based on the position of the support 80 on the slide rail 70, and take the distance as the theoretical depth value.

The processing module is configured to receive the theoretical depth value acquired by the acquiring module, receive the measured depth value acquired by the TOF module 40, compare the theoretical depth value with the measured depth value, and calculate the error of the depth value acquired and outputted by the TOF module 40 due to the multipath light.

In one exemplary embodiment of the present disclosure, the measured depth value refers to the depth value from the light source of the TOF module 40 to the central area of the light-splitting plate 10.

In application, for analyzing the error the depth value acquired and outputted by the TOF module 40 due to the mixed light of some specific long and short paths, the multipath light test device 100 for the TOF module may be adopted to test the mixed light of these specific long and short paths.

The TOF module 40 acquires and outputs the depth value of the central area of the light-splitting plate 10 of the multipath light test device 100 for the TOF module, namely the measured depth value of the light-splitting plate 10, based on the mixed light of these specific long and short paths. It should be noted that the measured depth value is the depth value of the light-splitting plate 10 acquired and outputted by the TOF module 40 after being affected by the mixed light of these specific long and short paths, and is different from the theoretical depth value.

Herein, the central area of the light-splitting plate 10 may be determined according to actual conditions. For example, it may be a circular area determined by taking a center point of the light-splitting plate 10 as the center of the circle area and taking 30% of the shortest side length of the light-splitting plate 10 as the radius of the circle area.

The mean value calculated through the measured depth values of all the pixels at the central area of the light-splitting plate 10 may be taken as the measured depth value of the light-splitting plate 10 acquired and outputted by the TOF module 40.

The accuracy of the depth value of the central area of the light-splitting plate 10 acquired and outputted by the TOF module 40 may be determined by calculating the difference between the measured depth value and the theoretical depth value.

In one exemplary embodiment of the present disclosure, the measured depth value is acquired by the TOF module 40 through measuring the depth value of the light-splitting plate 10 based on the light along the first optical path and the light along the second optical path.

That is to say, the TOF module 40 acquires and outputs the depth value of the central area of the light-splitting plate 10 of the multipath light test device 100 for the TOF module based on the mixed light of the specific long and short paths (i.e. light mixed by the light along the first optical path and the light along the second optical path).

In one exemplary embodiment of the present disclosure, the measured depth value is acquired by the TOF module 40 through measuring the depth value of the light-splitting plate 10 based on the light along the first optical path, the light along the second optical path and the light along the third optical path.

That is to say, the TOF module 40 acquires and outputs the depth value of the central area of the light-splitting plate 10 of the multipath light test device 100 for the TOF module based on the mixed light of the specific long and short paths (i.e. light mixed by the light along the first optical path, the light along the second optical path, and the light along the third optical path).

Figure 9:
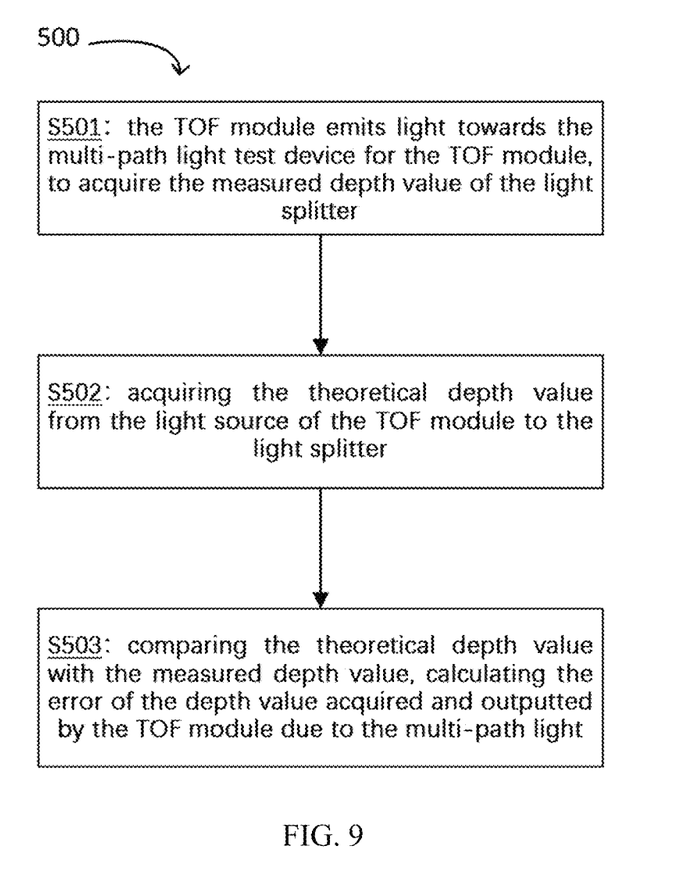
FIG. 9 is a schematic diagram illustrating an error measuring method for the depth value of a TOF module in accordance with some embodiments of the present disclosure.

FIG. 9 is a schematic diagram illustrating a method for measuring the error of the depth value of a TOF module in accordance with some embodiments of the present disclosure.

Based on the similar invention concept, as shown in FIG. 9, the embodiment of the present disclosure further provides a method 500 of measuring an error of the depth value of a TOF module, which employs the system of measuring the error of the depth value of the TOF module in accordance with the second aspect or any embodiment of the second aspect.

The method 500 of measuring the error of the depth value of the TOF module comprises: a step of acquiring a measured depth value (S501), a step of acquiring a theoretical depth value (S502), and a step of calculating error (S503).

In the step of acquiring the measured depth value (S501), the TOF module 40 emits light towards the multipath light test device 100 for the TOF module, so as to acquire the measured depth value of the light-splitting plate 10.

In the step of acquiring the theoretical depth value (S502): acquiring the theoretical depth value from the light source of the TOF module 40 to the light-splitting plate 10.

In the step of calculating the error (S503): comparing the theoretical depth value with the measured depth value, and calculating the error of the depth value acquired and outputted by the TOF module 40 due to the multipath light.

In one exemplary embodiment of the present disclosure, the theoretical depth value is the distance from the light source of the TOF module 40 to the light-splitting plate 10. The measured depth value is a depth value calculated according to the time that the light, emitted from the TOF module 40 to the multipath light test device 100 for the TOF module, returned through the multipath light test device 100 for the TOF module.

In one exemplary embodiment of the present disclosure, the measured depth value is the depth value from the light source of the TOF module 40 to the central area of the light-splitting plate 10.

In one exemplary embodiment of the present disclosure, the measured depth value is acquired by the TOF module 40 through measuring the depth value of the light-splitting plate 10 based on the light from the first optical path and the light from the second optical path.

Figure 10:
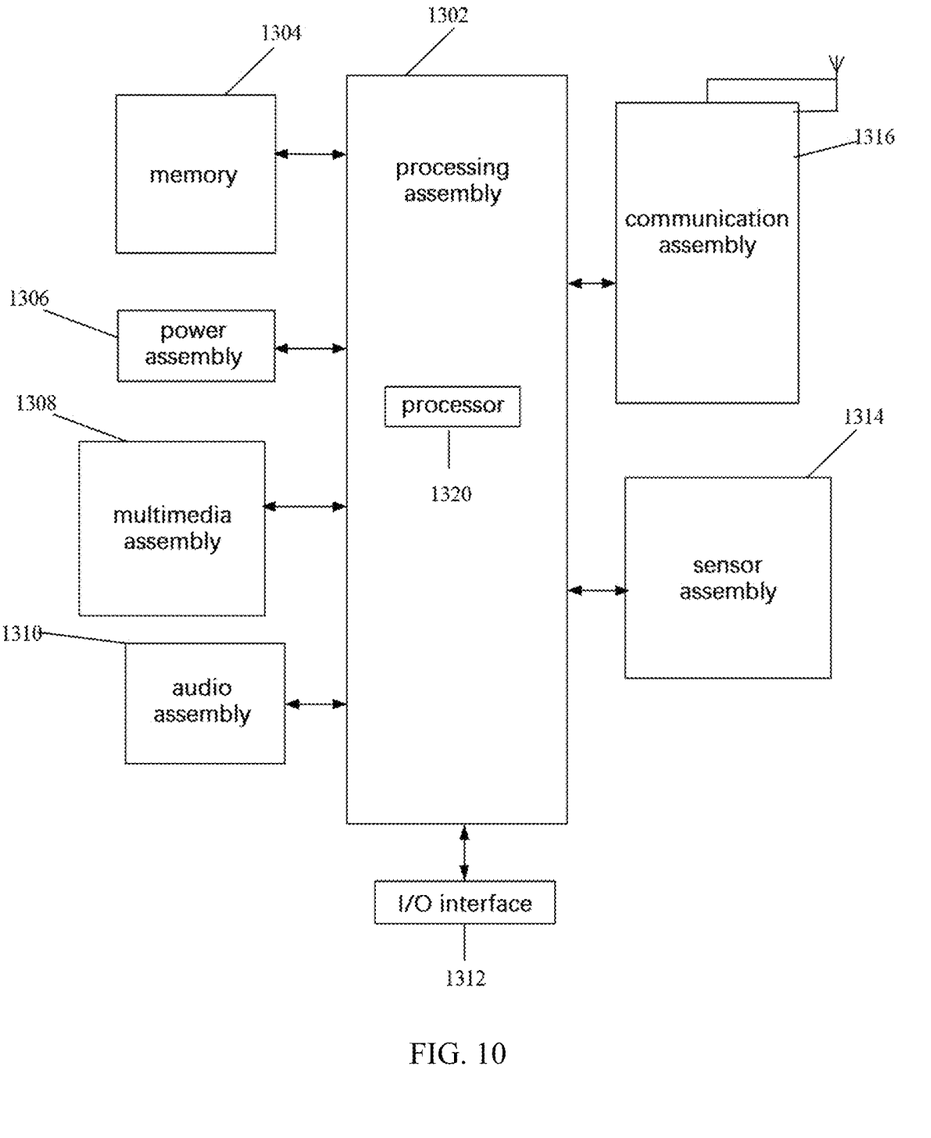
FIG. 10 is a block diagram illustrating an error measuring device for the depth value of a TOF module in accordance with some embodiments of the present disclosure.

In one exemplary embodiment of the present disclosure, the measured depth value is acquired by the TOF module 40 through measuring the depth value of the light-splitting plate 10 based on the light from the first optical path, the light from the second optical path and the light from the third optical path FIG. 10 is a block diagram illustrating a device of executing the method 500 of measuring error of the depth value of the TOF module in accordance with some embodiments of the present disclosure. For instance, the device may be a mobile phone, a computer, a digital broadcasting terminal, a messaging device, a game console, a tablet, a medical device, a fitness apparatus, a personal digital assistant, and the like.

Referring to FIG. 10, the device may include one or more following assemblies: a processing assembly 1302, a memory 1304, a power assembly 1306, a multimedia assembly 1308, an audio assembly 1310, an input/output (I/O) interface 1312, a sensor assembly 1314, and a communication assembly 1316.

The processing assembly 1302 typically controls the overall operation of the device, such as the operations associated with display, telephone calls, data communication, camera operation, and recording operations. The processing assembly 1302 may include one or more processors 1320 to execute instructions to perform all or part of the steps in the above method. In addition, the processing assembly 1302 may include one or more modules which facilitate the interaction between the processing assembly 1302 and other assemblies. For instance, the processing assembly 1302 may include a multimedia module to facilitate the interaction between the multimedia assembly 1308 and the processing assembly 1302.

The memory 1304 is configured to store various types of data to support the operation of the device. Examples of such data include instructions for any applications or methods operated on the device, contact data, phonebook data, messages, pictures, video, etc. The memory 1304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power assembly 1306 provides power to various assemblies of the device. The power assembly 1306 may include a power management system, one or more power sources, and any other assemblies associated with the generation, management, and distribution of power in the device.

The multimedia assembly 1308 includes a screen providing an output interface between the device and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and the pressure associated with the touch or swipe action. In some embodiments, the multimedia assembly 1308 includes a front camera and/or a rear camera. The front camera and the rear camera may receive external multimedia data while the device is in an operation mode, such as a photographing mode or a video mode. Each of the front camera and the rear camera may be a fixed optical lens system or have focus and optical zoom capability.

The audio assembly 1310 is configured to output and/or input audio signals. For example, the audio assembly 1310 includes a microphone ("MIC") configured to receive an external audio signal when the device is in an operation mode, such as a call mode, a recording mode, and a voice recognition mode. The received audio signal may be further stored in the memory 1304 or transmitted via the communication assembly 1316. In some embodiments, the audio assembly 1310 further includes a speaker to output audio signals.

The I/O interface 1312 provides an interface between the processing assembly 1302 and peripheral interface modules, such as a keyboard, a click wheel, buttons, and the like. The buttons may include, but are not limited to, a home button, a volume button, a starting button, and a locking button.

The sensor assembly 1314 includes one or more sensors to provide status assessments of various aspects of the device. For instance, the sensor assembly 1314 may detect an open/closed status of the device, relative positioning of assemblies, e.g., the display and the keypad, of the device, a change in position of the device or a assembly of the device, a presence or absence of user contact with the device, an orientation or an acceleration/deceleration of the device, and a change in temperature of the device. The sensor assembly 1314 may include a proximity sensor configured to detect the presence of nearby objects without any physical contact. The sensor assembly 1314 may further include a light sensor, such as a CMOS or CCD image sensor, for use in imaging applications. In some embodiments, the sensor assembly 1314 may also include an accelerometer sensor, a gyroscope sensor, a magnetic sensor, a pressure sensor, or a temperature sensor.

The communication assembly 1316 is configured to facilitate communication, wired or wirelessly, between the device and other devices. The device can access a wireless network based on a communication standard, such as Wi-Fi, 2G, or 3G, or a combination thereof. In one exemplary embodiment, the communication assembly 1316 receives a broadcast signal or broadcast associated information from an external broadcast management system via a broadcast channel. In one exemplary embodiment, the communication assembly 1316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic assemblies, for performing the above methods.

In exemplary embodiments, there is also provided a non-transitory computer-readable storage medium including instructions, such as included in the memory 1304, executable by the processor 1320 in the device, for performing the above-described methods. For example, the non-transitory computer-readable storage medium may be a ROM, a random-access memory (RAM), a CD-ROM, a magnetic tape, a floppy disc, an optical data storage device, and the like.

In exemplary embodiments, there is also provided a non-transitory computer-readable storage medium including instructions, such as included in the memory 1304, executable by the processor 1320 in the device, for performing the above-described methods. For example, the non-transitory computer-readable storage medium may be a ROM, a random-access memory (RAM), a CD-ROM, a magnetic tape, a floppy disc, an optical data storage device, and the like.

Various embodiment of the present disclosure can have one or more of the following advantages.

The multipath light is simulated by the reasonable arrangement of the light-splitting plate, the first reflector plate and the second reflector plate, so as to qualitatively and quantitatively determine the error of the depth value acquired by the TOF module due to the multipath light.

It can be further understood that "a plurality" in the present disclosure refers to two or more, and other quantifiers are similar thereto. "And/or" describes the association relationship of the associated objects, and indicates that there can be three kinds of relationships. For example, A and/or B can mean that there are three cases in which A exists alone, A and B exist, and B exists alone. The symbol "/" generally indicates that the related objects are an "or" relationship. The singular forms "a/an," "the," and "said" are intended to include the plural forms as well, unless the context clearly indicates otherwise.

It can further be understood that while operations are depicted in the drawings in a particular order in the embodiments of the present disclosure, this should not be construed as requiring that such operations be performed in the particular order shown or in sequential order, or that all illustrated operations be performed, to achieve desirable results. In certain circumstances, multitasking and parallel processing can be advantageous.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present invention is not limited to the exact construction that has been described above and illustrated in the accompanying drawings, and that various modifications and changes can be made without departing from the scope thereof. It is intended that the scope of the present disclosure only be limited by the appended claims.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

The above description includes part of embodiments of the present disclosure, and not limits the present disclosure. Any modifications, equivalent substitutions, improvements, etc., within the spirit and principles of the present disclosure, are included in the scope of protection of the present disclosure.

It is apparent that those of ordinary skill in the art can make various modifications and variations to the embodiments of the disclosure without departing from the spirit and scope of the disclosure. Thus, it is intended that the present disclosure cover the modifications and the modifications.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or device.

In the case of no more limitation, the element defined by the sentence "includes a . . . " does not exclude the existence of another identical element in the process, the method, or the device including the element.

Specific examples are used herein to describe the principles and implementations of some embodiments. The description is only used to help convey understanding of the possible methods and concepts. Meanwhile, those of ordinary skill in the art can change the specific manners of implementation and application thereof without departing from the spirit of the disclosure. The contents of this specification therefore should not be construed as limiting the disclosure.

For example, in the description of the present disclosure, the terms "some embodiments," or "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the descriptions, with respect to circuit(s), unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of module, devices or components, etc. are employed, the circuit(s), unit(s), device(s), component(s), etc. can be singular, or plural.

Based on various embodiments of the present disclosure, the disclosed apparatuses, devices, and methods can be implemented in other manners. For example, the abovementioned devices can employ various methods of use or implementation as disclosed herein.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

Dividing the device into different "regions," "module," "components" or "layers," etc. merely reflect various logical functions according to some embodiments, and actual implementations can have other divisions of "regions," "module," "components" or "layers," etc. realizing similar functions as described above, or without divisions. For example, multiple regions, module, or layers, etc. can be combined or can be integrated into another system. In addition, some features can be omitted, and some steps in the methods can be skipped.

Those of ordinary skill in the art will appreciate that the module, components, regions, or layers, etc. in the devices provided by various embodiments described above can be provided in the one or more devices described above. They can also be located in one or multiple devices that is (are) different from the example embodiments described above or illustrated in the accompanying drawings. For example, the module, regions, or layers, etc. in various embodiments described above can be integrated into one module or divided into several sub-modules.

The various device components, modules, module, blocks, or portions may have modular configurations, or are composed of discrete components, but nonetheless can be referred to as "modules" in general. In other words, the "components," "modules," "blocks," "portions," or "module" referred to herein may or may not be in modular forms.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of the exemplary embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

The invention claimed is:

1. A multipath light test device for a time of flight (TOF) module, comprising:
   a light-splitting plate configured to split light emitted from the TOF module;
   a first reflector plate connected to the light-splitting plate and forming a first angle with the light-splitting plate; and
   a second reflector plate disposed on one side opposite to the first reflector plate, forming a second angle with the first reflector plate,
   wherein one part of the light emitted from the TOF module is returned to the TOF module along a first optical path after being reflected on the light-splitting plate with a first reflectivity; and
   another part of the light emitted from the TOF module is transmitted through the light-splitting plate, incident to the first reflector plate and further to the second reflector plate, and then returned to the TOF module along a second optical path.

2. The multipath light test device for the TOF module according to claim 1, wherein
   the first optical path comprises: an incident light path along which the light emitted is incident to the light-splitting plate and a first return light path along which the light is returned to the TOF module; and
   the second optical path comprises: a first incident light path along which the light emitted is incident to the light-splitting plate, a second incident light path along which the light is transmitted through the light-splitting plate and incident to the first reflector plate, and a second return light path along which the light is reflected by the first reflector plate and the second reflector plate and returned to the TOF module.

3. The multipath light test device for the TOF module according to claim 1, wherein
   each of the first angle and the second angle is 45°.

4. The multipath light test device for the TOF module according to claim 2, wherein
   the second return light path comprises: a third incident light path along which the light transmitted through the light-splitting plate and incident to the first reflector plate is reflected by the first reflector plate and incident to the second reflector plate, a third reflected light path along which the light is reflected by the second reflector plate to the first reflector plate, a fourth incident light path along which the light is reflected by the first reflector plate and incident to the light-splitting plate, and a light path along which the light is transmitted through the light-splitting plate and returned to the TOF module.

5. The multipath light test device for the TOF module according to claim 4, wherein
   one part of light that is reflected by the first reflector plate and incident to the light-splitting plate is reflected by the light-splitting plate; reflected light is incident to the first reflector plate and returned to the TOF module along a third optical path; and
   the third optical path comprises: a first incident light path along which the incident light is incident to the light-splitting plate, a second incident light path along which the light is transmitted through the light-splitting plate and incident to the first reflector plate, a third incident light path along which the light is reflected by the first reflector plate and incident to the second reflector plate, a third reflected light path along which the light is reflected by the second reflector plate to the first reflector plate, a fourth incident light path along which the light is reflected by the first reflector plate and incident to the light-splitting plate, a fifth incident light path along which the light is reflected by the light-splitting plate and incident to the first reflector plate, a sixth incident light path along which the light is reflected by the first reflector plate and incident to the second reflector plate, a sixth reflected light path along which the light is reflected by the second reflector plate to the first reflector plate, a seventh incident light path along which the light is reflected by the first reflector plate and incident to the light-splitting plate, and a light path along which the light is transmitted through the light-splitting plate and returned to the TOF module.

6. The multipath light test device for the TOF module according to claim 1, wherein
   light-splitting layers are coated on both sides of the light-splitting plate for splitting the light incident to the light-splitting plate to a light reflected from the light-splitting plate and a light transmitted through the light-splitting plate.

7. The multipath light test device for the TOF module according to claim 1, further comprising:
   a housing;
   the housing is provided with a window;
   the light-splitting plate is disposed at the window; and
   the first reflector plate and the second reflector plate are disposed within the housing.

8. The multipath light test device for the TOF module according to claim 7, further comprising:
   a base on which the housing is disposed;
   a slide rail disposed on the base; and
   a support disposed on the slide rail and movable along the lengthwise direction of the slide rail, the TOF module being disposed on the support;
   wherein a distance between the TOF module and the light-splitting plate is adjusted by movement of the support on the slide rail.

9. The multipath light test device for the TOF module according to claim 8, wherein
   the TOF module mounted on the support is arranged opposite to a central area of the light-splitting plate.

10. An error measuring system for a depth value of a TOF module, comprising:
    the multipath light test device for the TOF module according to claim 1;
    the TOF module configured to emit light towards the multipath light test device for the TOF module and acquire the measured depth value of the light-splitting plate;
    an acquiring module configured to acquire a distance from a light source of the TOF module mounted on the support to the light-splitting plate based on position of the support on the slide rail, and take the distance as a theoretical depth value; and
    a processing module configured to receive the theoretical depth value acquired by the acquiring module, receive the measured depth value acquired by the TOF module, compare the theoretical depth value with the measured depth value, and calculate the error of the depth value of the TOF module resulted from the multipath light.

11. The error measuring system for the depth value of the TOF module according to claim 10, wherein the measured depth value is a depth value from the light source of the TOF module to a central area of the light-splitting plate.

12. The error measuring system for the depth value of the TOF module according to claim 10, wherein
the measured depth value is acquired by the TOF module through measuring the depth value of the light-splitting plate based on light from the first optical path and light from the second optical path.

13. The error measuring system for the depth value of the TOF module according to claim 10, wherein
one part of light that is reflected by the first reflector plate and incident to the light-splitting plate is reflected by the light-splitting plate; reflected light is incident to the first reflector plate and returned to the TOF module along a third optical path.

14. The error measuring system for the depth value of the TOF module according to claim 13, wherein
the measured depth value is acquired by the TOF module through measuring the depth value of the light-splitting plate based on light from the first optical path, light from the second optical path, and light from the third optical path.

15. An error measuring method for a depth value of a TOF module, employing the error measuring system for the depth value of the TOF module according to claim 10, the method comprising:
allowing the TOF module to emit light towards the multipath light test device for the TOF module and acquire the measured depth value of the light-splitting plate;
acquiring the theoretical depth value from the light source of the TOF module to the light-splitting plate; and
comparing the theoretical depth value with the measured depth value and calculating the error of the depth value of the TOF module resulted from the multipath light.

16. The error measuring method for the depth value of the TOF module according to claim 15, wherein
the theoretical depth value is the distance between the light source of the TOF module and the light-splitting plate; and
the measured depth value is a depth value of the light-splitting plate calculated according to the time during which light, emitted from the TOF module towards the multipath light test device for the TOF module, is returned through the multipath light test device for the TOF module.

17. The error measuring method for the depth value of the TOF module according to claim 15, wherein
the measured depth value is a depth value from the light source of the TOF module to the central area of the light-splitting plate.

18. The error measuring method for the depth value of the TOF module according to claim 15, wherein
the measured depth value is acquired by the TOF module through measuring the depth value of the light-splitting plate based on light from the first optical path and light from the second optical path.

19. The error measuring method for the depth value of the TOF module according to claim 15, wherein
the measured depth value is acquired by the TOF module through measuring the depth value of the light-splitting plate based on light from the first optical path, light from the second optical path and light from the third optical path.

20. An error measuring system for a depth value of a TOF module comprising the multipath light test device for the TOF module according to claim 1, wherein multipath light is simulated with an arrangement of the light-splitting plate, the first reflector plate and the second reflector plate such that the system is configured to qualitatively and quantitatively determine error of a depth value acquired by the TOF module due to the multipath light.

* * * * *